(12) United States Patent
Zink et al.

(10) Patent No.: US 7,758,120 B2
(45) Date of Patent: Jul. 20, 2010

(54) COMPACTIBLE JUVENILE VEHICLE SEAT WITH FORWARD-FOLDING BACKREST AND U-SHAPED BACKREST FRAME

(75) Inventors: Paul T. Zink, Indianapolis, IN (US); Dennis M. Turner, Mooresville, IN (US); Andrew B. Mendenhall, Mooresville, IN (US)

(73) Assignee: Cosco Management, Inc., Wilmington, DE (US)

( * ) Notice: Subject to any disclaimer, the term of this patent is extended or adjusted under 35 U.S.C. 154(b) by 8 days.

(21) Appl. No.: 12/036,072

(22) Filed: Feb. 22, 2008

(65) Prior Publication Data
US 2008/0224507 A1 Sep. 18, 2008

Related U.S. Application Data

(60) Provisional application No. 60/894,586, filed on Mar. 13, 2007.

(51) Int. Cl.
*B60N 2/26* (2006.01)
*B60N 2/02* (2006.01)
(52) U.S. Cl. .............................. 297/250.1; 297/378.12
(58) Field of Classification Search ............ 297/411.34, 297/378.12, 250.1, 255
See application file for complete search history.

(56) References Cited

U.S. PATENT DOCUMENTS

| 1,641,953 | A | 9/1927 | Abraham |
| 1,742,822 | A | 1/1930 | Olson |
| 3,762,768 | A | 10/1973 | Hyde et al. |
| 4,986,600 | A | 1/1991 | Leblanc et al. |
| 5,121,965 | A | 6/1992 | Skold et al. |
| 5,413,401 | A * | 5/1995 | Koyanagi ................. 297/250.1 |
| 5,496,092 | A | 3/1996 | Williams et al. |
| 5,499,860 | A | 3/1996 | Smith et al. |
| 5,647,634 | A | 7/1997 | Presser et al. |
| 5,785,383 | A * | 7/1998 | Otero ......................... 297/255 |
| 5,803,543 | A | 9/1998 | Hartmann |
| 6,179,362 | B1 | 1/2001 | Wisniewski et al. |
| 6,474,735 | B1 * | 11/2002 | Carnahan et al. ......... 297/250.1 |
| 6,685,266 | B2 * | 2/2004 | James et al. ............. 297/250.1 |
| 6,767,058 | B2 | 7/2004 | McClellan-Derrickson |
| 6,773,064 | B2 | 8/2004 | Tren et al. |
| 6,840,577 | B2 | 1/2005 | Watkins |
| 6,908,151 | B2 | 6/2005 | Meeker et al. |
| 6,932,429 | B2 | 8/2005 | Kamiki |
| 7,000,985 | B2 | 2/2006 | Belgarde |
| 7,229,132 | B2 * | 6/2007 | Meeker et al. ........... 297/250.1 |
| 7,625,043 | B2 | 12/2009 | Hartenstine et al. |
| 2004/0061366 | A1 | 4/2004 | Meeker et al. |
| 2004/0124677 | A1 | 7/2004 | Meeker et al. |
| 2005/0052059 | A1 | 3/2005 | Oto |
| 2005/0186068 | A1 | 8/2005 | Coulson et al. |
| 2005/0264059 | A1 | 12/2005 | Clement et al. |
| 2005/0264065 | A1 | 12/2005 | Clement et al. |
| 2006/0006712 | A1 | 1/2006 | Clement et al. |
| 2006/0012234 | A1 | 1/2006 | Collias |
| 2006/0138823 | A1 | 6/2006 | Huang |
| 2007/0236061 | A1* | 10/2007 | Meeker et al. ........... 297/250.1 |

* cited by examiner

*Primary Examiner*—Milton Nelson, Jr.
(74) *Attorney, Agent, or Firm*—Barnes & Thornburg LLP

(57) ABSTRACT

A juvenile vehicle seat includes a seat base adapted to set on a vehicle seat and a foldable backrest associated with the seat base. The juvenile vehicle seat also includes a backrest lock coupled to the foldable backrest.

19 Claims, 5 Drawing Sheets

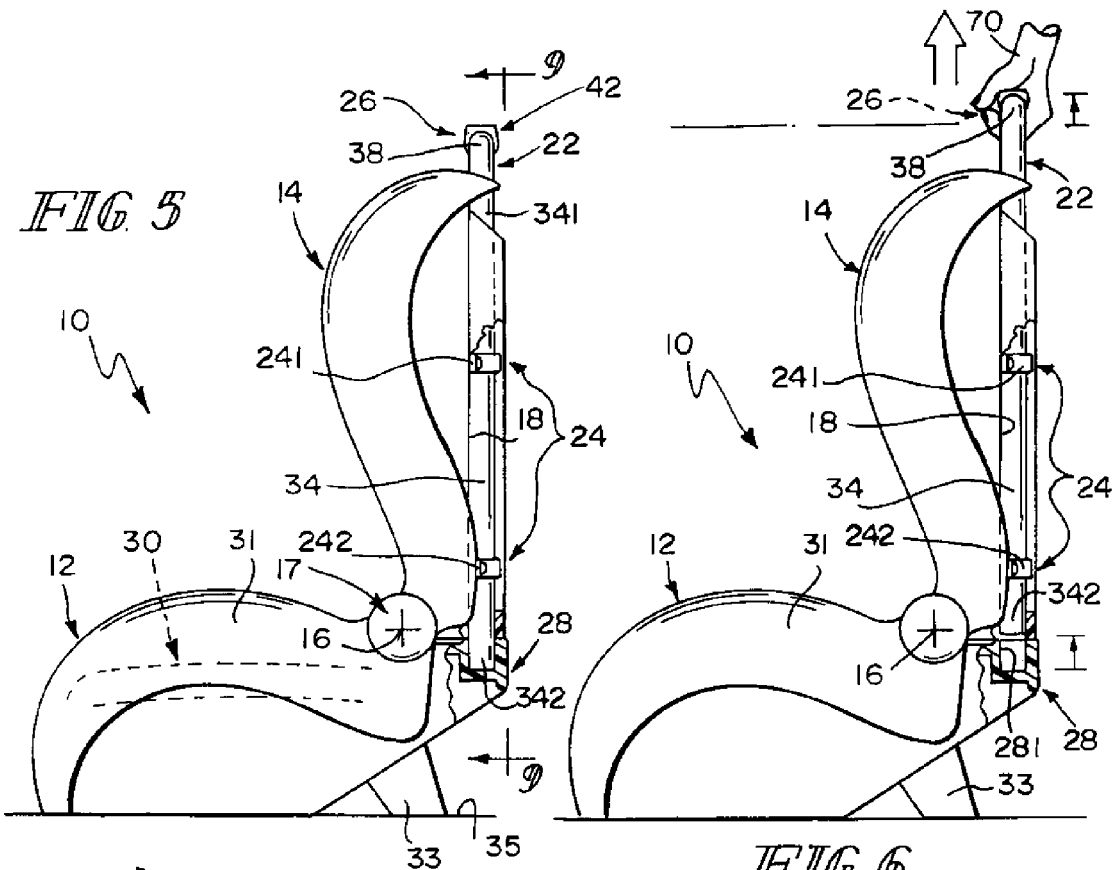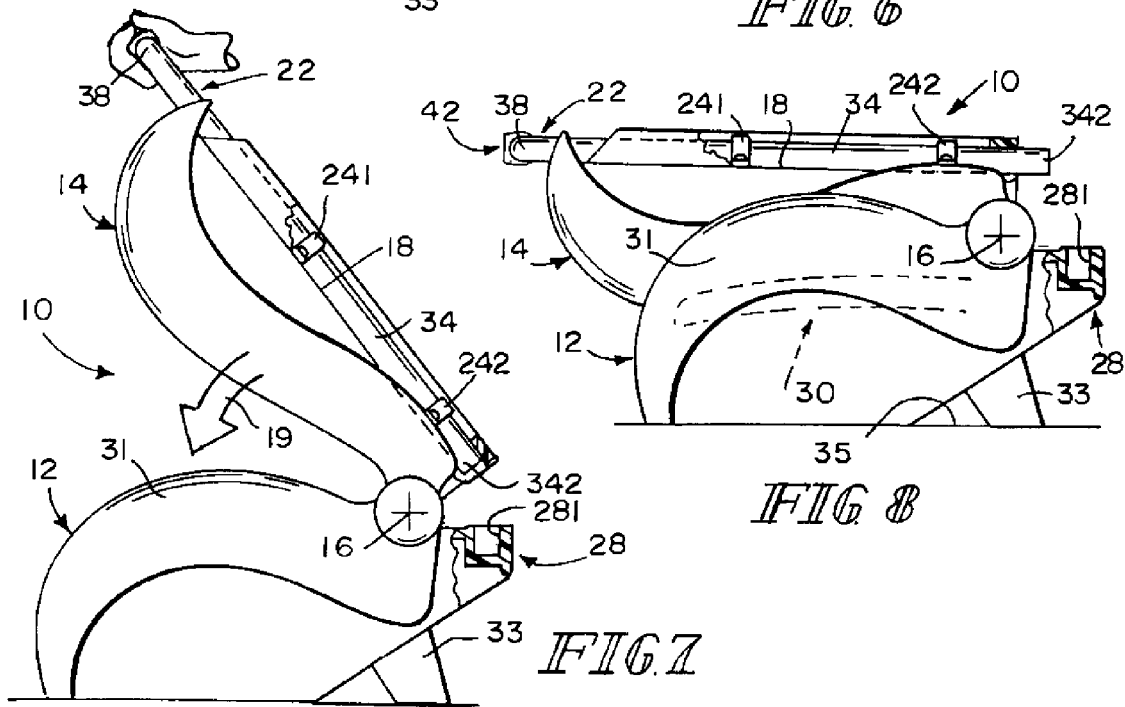

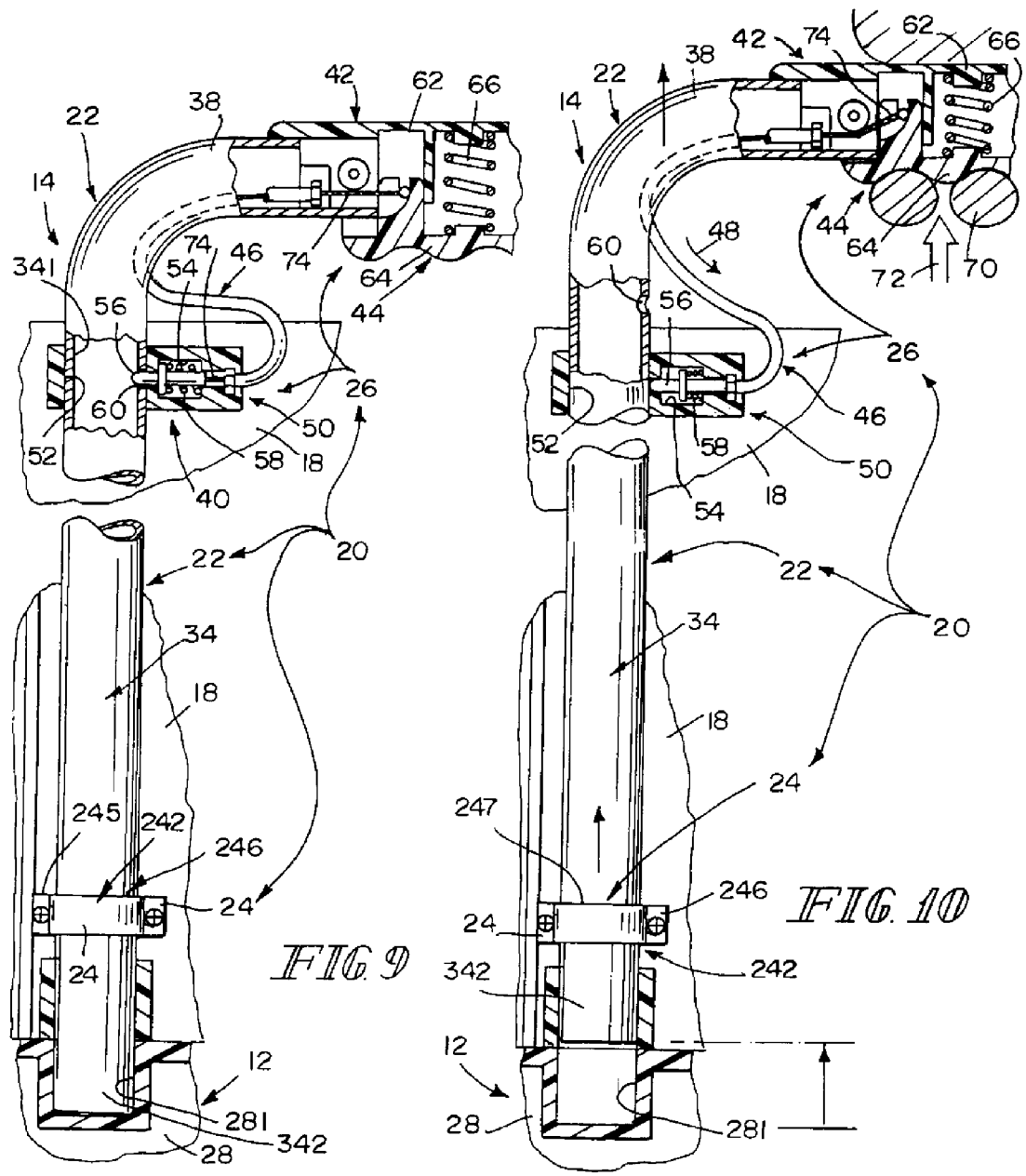

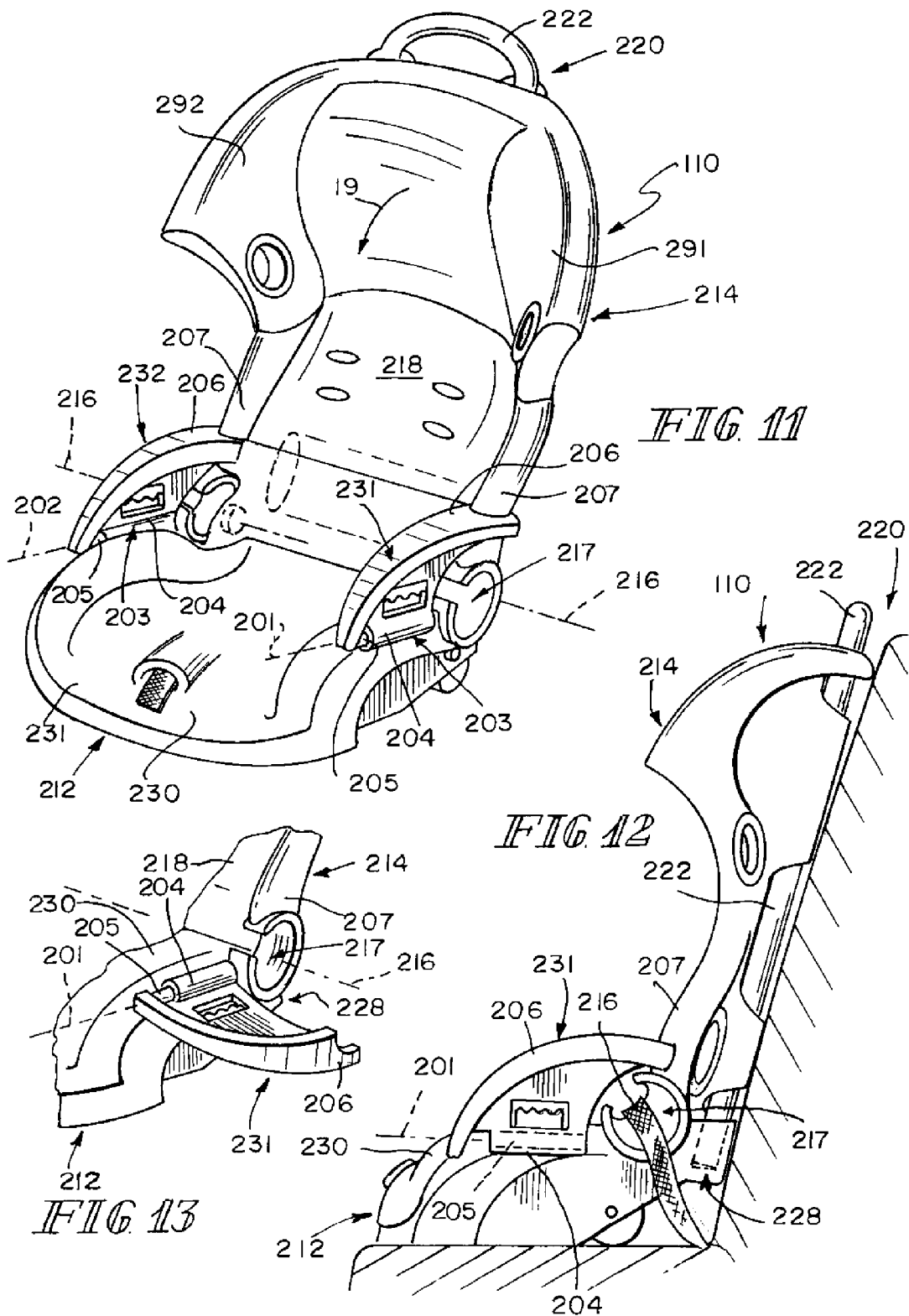

COMPACTIBLE JUVENILE VEHICLE SEAT WITH FORWARD-FOLDING BACKREST AND U-SHAPED BACKREST FRAME

This application claims priority under 35 U.S.C. §119 (e) to U.S. Provisional Application Ser. No. 60/894,586, filed Mar. 13, 2007, which is expressly incorporated by reference herein.

BACKGROUND

The present disclosure relates to juvenile vehicle seats, and in particular, to vehicle seats having backrests that move relative to seat bottoms. More particularly, the present disclosure relates to a juvenile vehicle seat having a foldable backrest and a releasable backrest lock.

SUMMARY

A juvenile vehicle seat in accordance with the present disclosure includes a stationary seat base and a seat back including a foldable backrest and a backrest lock. The backrest lock is configured normally to lock the foldable backrest in an upright use position relative to the stationary seat base. When unlocked, the backrest is free to move relative to the seat base to assume a storage position.

In illustrative embodiments, the backrest lock includes a first backrest-lock leg mounted on the foldable backrest for movement between backrest-locking and backrest-releasing positions. In the backrest-locking position, the first backrest-lock leg engages a first leg receiver formed in the seat base to block pivotable movement of the foldable backrest about a pivot axis established by an axle coupled to the seat base and to the foldable backrest. In the backrest-releasing position, the first backrest-lock leg disengages the first leg receiver to free the foldable backrest to pivot on the axle about the pivot axis.

In illustrative embodiments, the backrest lock can be operated by a caregiver so that the foldable backrest is released and free to move relative to the seat base to assume a compact folded storage position along a top surface of the seat base. The top surface of the seat base is adapted to support the hips and legs of a juvenile seated in the juvenile vehicle seat.

In illustrative embodiments, the backrest lock includes a backrest frame and a frame anchor. The backrest frame is mounted for movement on the foldable backrest between a backrest-locking position engaging a frame receiver included in the seat base and a backrest-releasing position disengaging the frame receiver. The frame anchor is coupled to the foldable backrest and the backrest frame and is configured normally to anchor the backrest frame to the foldable backrest upon movement of the backrest frame to the backrest-locking position engaging the frame receiver included in the seat base so that the foldable backrest is retained in the upright use position.

A caregiver can operate the frame anchor to release the backrest frame to allow movement of the backrest frame relative to the foldable backrest to the backrest-releasing position disengaging the frame receiver in the seat base. Once the foldable backrest is released, the caregiver can pivot the foldable backrest about a pivot axis relative to the seat base toward the compact folded storage position.

In illustrative embodiments, the movable backrest frame is U-shaped and includes a horizontal style bar interconnecting two spaced-apart vertical backrest-lock legs. The frame receiver is formed to include separate first and second leg-receiving sockets located in the seat base under the movable backrest frame to receive lower ends of the backrest-lock legs upon movement of the backrest frame relative to the foldable backrest to assume the backrest-locking position. A trigger portion of the frame anchor is coupled to the horizontal style bar of the backrest frame to move therewith. Other lock pin portions of the frame anchor are coupled to the backrest and configured to engage and disengage the backrest-lock legs of the backrest frame during operation of the frame anchor by a caregiver.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is a side elevation view of the juvenile vehicle seat of FIGS. 3 and 4 with portions of the seat base and back removed to show insertion of a lower end of the first backrest-lock leg of the movable backrest frame into a companion first leg-receiving socket formed in the frame receiver of the seat base to retain the foldable backrest in the upright use position relative to the stationary seat base;

FIG. 6 is a side elevation view similar to FIG. 5 showing upward movement of the unlocked backrest frame in response to a lifting force applied to the style bar of the movable backrest frame by a caregiver to withdraw the lower end of the first backrest-lock leg of the backrest frame from the companion first leg-receiving socket formed in the frame receiver of the seat base to release the foldable backrest so that it is free to move to a compact folded storage position as shown in FIGS. 7 and 8;

FIG. 7 is a side elevation view similar to FIGS. 5 and 6 showing counterclockwise (forward) pivoting motion of the foldable backrest about the pivot axis toward the compact folded storage position;

FIG. 8 is a side elevation view similar to FIGS. 5-7 showing the foldable backrest in an illustrative compact folded storage position that is also shown in FIG. 4;

FIG. 9 is an enlarged rear elevation view of a portion of the juvenile vehicle seat of FIGS. 2-8 taken along line 9-9 of FIG. 5, with portions broken away, showing, from top to bottom, components included in an illustrative spring-biased release handle and an illustrative spring-biased leg-retainer latch included in the frame anchor and placement of the lower end of the first backrest-lock leg of the movable backrest frame in the first leg-receiving socket formed in the seat base;

FIG. 10 is a view similar to FIG. 9 showing the backrest frame in the lifted position shown in FIG. 6 after manual operation of the spring-biased release handle of FIG. 9 to disengage the spring-biased leg-retainer latch of FIG. 9 from the first backrest-lock leg of the backrest frame;

FIG. 11 is a perspective view of a juvenile vehicle seat in accordance with another illustrative embodiment of the present disclosure and showing pivotable first and second armrests moved to assume upright positions on opposite sides of a seat bottom;

FIG. 12 is a right-side elevation view of the juvenile vehicle seat of FIG. 11; and FIG. 13 is a perspective view of a portion of the juvenile vehicle seat of FIGS. 11 and 12 showing the first armrest after it has been pivoted outwardly to move from the upright position shown in FIGS. 11 and 12 to a lowered position.

DETAILED DESCRIPTION

Figure 1:
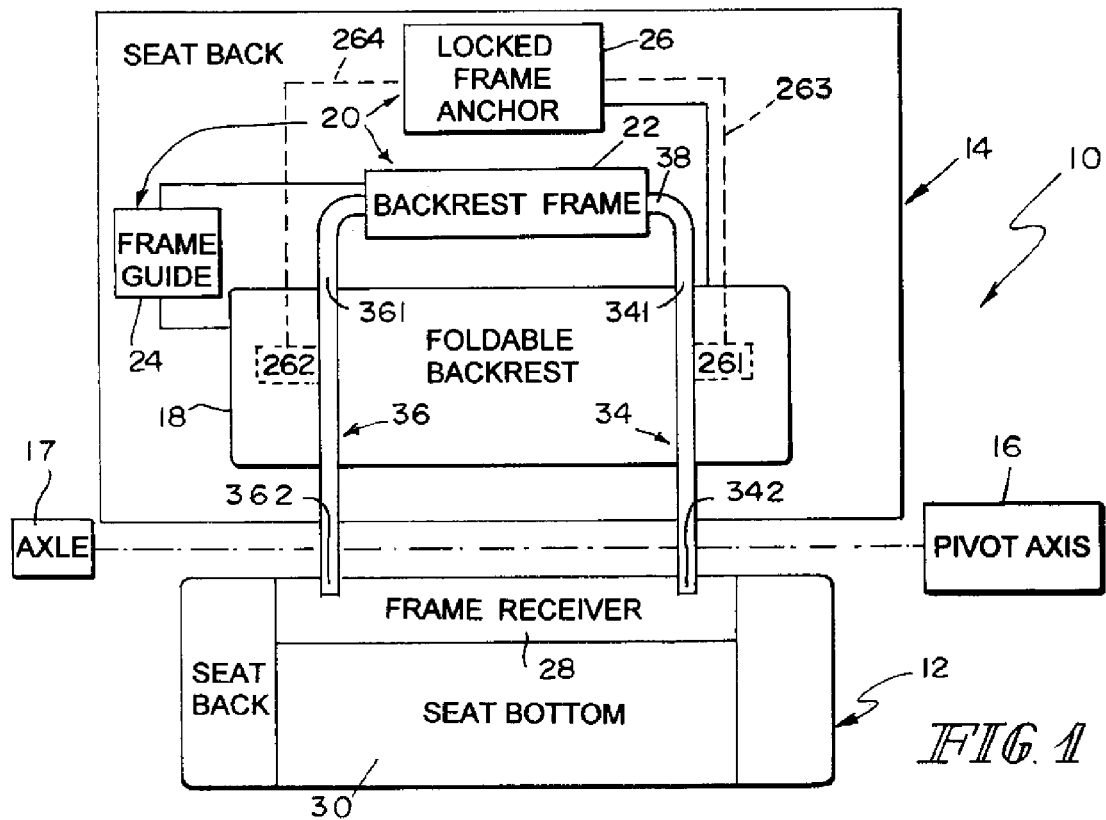
FIG. 1 is a diagrammatic view of a compactible juvenile vehicle seat in accordance with the present disclosure showing a seat base including a seat bottom, an axle, and a frame receiver and a seat back including a foldable backrest mounted on the axle for folding movement about a pivot axis, a backrest frame mounted for movement relative to the foldable backrest and formed to include two backrest-lock legs, and a frame anchor and showing the frame anchor in a locked state wherein the backrest frame lies in a backrest-locking position mating the two backrest-lock legs with the frame receiver in the seat base to retain the foldable backrest in an upright use position relative to the stationary seat base.
Figure 2:
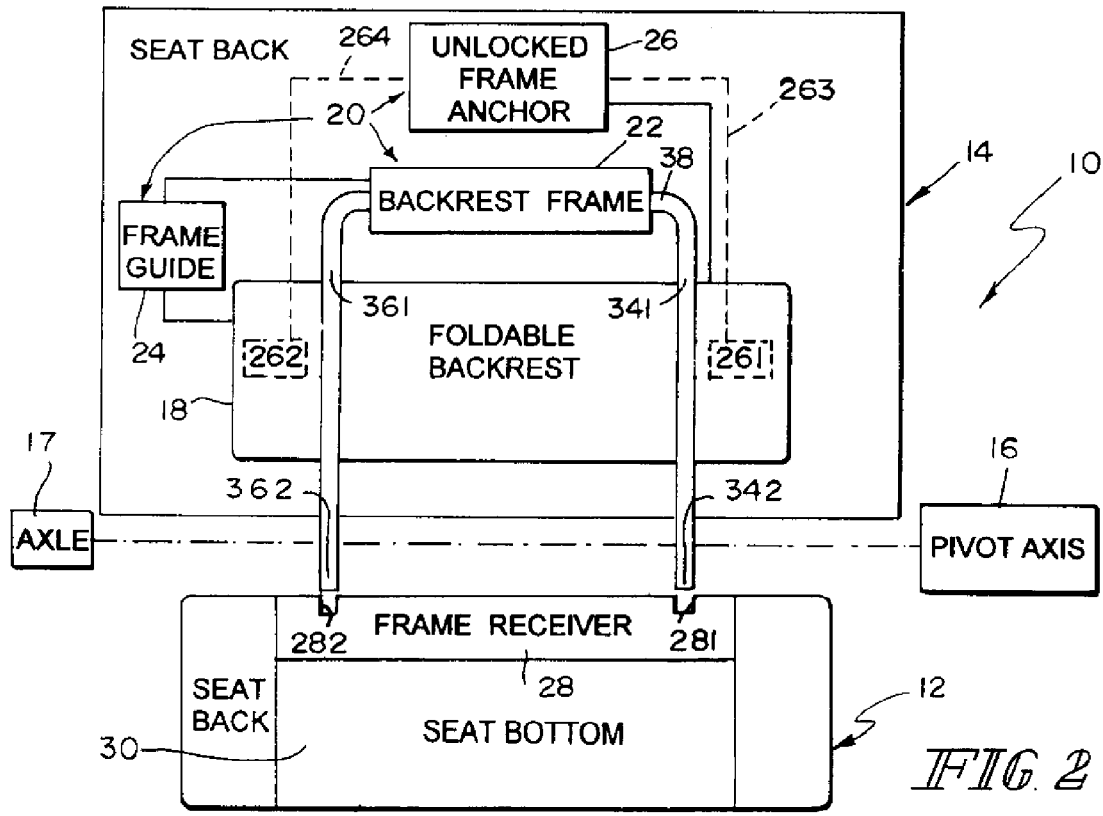
FIG. 2 is a view similar to FIG. 1 showing the frame anchor in an unlocked state and movement of the backrest frame relative to the upright backrest to a backrest-releasing position unmating the two backrest-lock legs from the frame receiver in the seat base to release the upright backrest so that it is free to pivot about the pivot axis relative to the seat base to assume a storage position.
Figure 3:
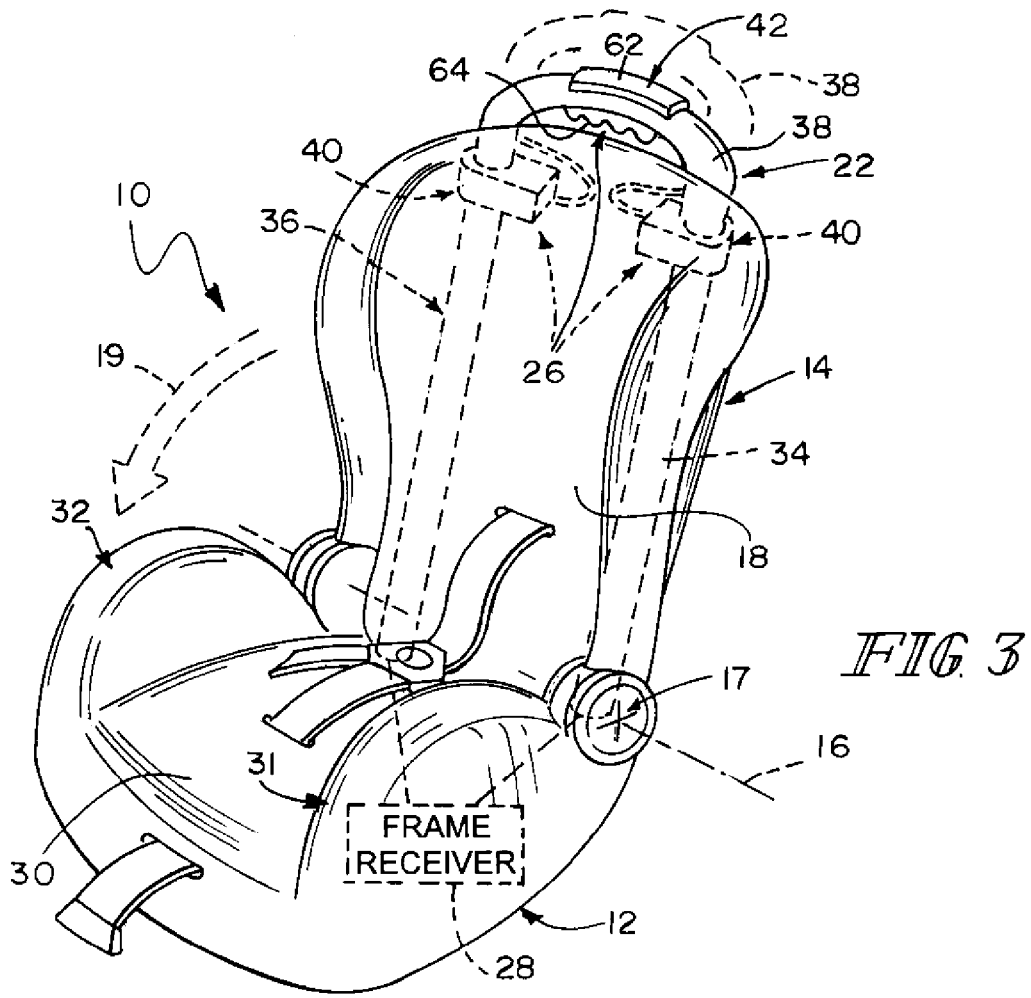
FIG. 3 is a perspective view of an illustrative compactible juvenile vehicle seat in accordance with the present disclosure showing a foldable backrest retained in an upright use position by a U-shaped backrest frame including first and second backrest-lock legs (shown in phantom) and an exposed style bar (shown in solid) arranged to interconnect upper ends of the first and second backrest-lock legs and lie above the foldable backrest and also showing an illustrative frame anchor (shown partly in solid and partly in phantom) coupled to the style bar and each of the first and second backrest-lock legs and configured to assume a locked state retaining the first and second backrest-lock legs in mated relation to a frame receiver included in the seat base.

A compatible juvenile vehicle seat 10 includes a seat base 12 and a seat back 14 including a foldable backrest 18 coupled to seat base 12 at a pivot axis 16 using any suitable axle 17 as suggested diagrammatically in FIG. 1 and illustratively in FIG. 3. Seat back 14 also includes a backrest lock 20 configured normally to retain foldable backrest 18 in an upright use position shown diagrammatically in FIG. 1 and illustratively in FIGS. 3, 5, and 9. Backrest lock 20 can be operated manually by a caregiver as suggested diagrammatically in FIG. 2 and illustratively in FIGS. 6 and 10 to free foldable backrest 18 so that, once freed, it can be pivoted about pivot axis 16 as suggested in FIG. 7 to assume a storage position such as, for example, the compact folded storage position shown in FIGS. 4 and 8. Another juvenile vehicle seat 110 including backrest lock 220 and pivotable armrests 231, 232 is shown in FIGS. 11-13.

As suggested in FIG. 1, backrest lock 20 includes a movable backrest frame 22, a frame guide 24, and a frame anchor 26. Seat base 12 is formed to include a frame receiver 28 associated with backrest frame 22 and a seat bottom 30 coupled to frame receiver 28 as suggested in FIG. 1 and adapted to support a juvenile (not shown) seated in juvenile vehicle seat 10.

Frame guide 24 is coupled to foldable backrest 18 and configured to support backrest frame 22 for movement relative to foldable backrest 18 and to seat base 12 between a backrest-locking position mating with frame receiver 28 included in seat base 12 as suggested in FIG. 1 and a backrest-releasing position not mating with frame receiver 28 as suggested in FIG. 2. Foldable backrest 18 is retained in the upright use position as suggested in FIG. 1 when backrest frame 22 has been moved to the backrest-locking position mating with frame receiver 28 in seat base 12. Frame anchor 26 is provided normally to anchor backrest frame 22 in the backrest-locking position whenever foldable backrest 18 lies in the upright use position as shown in FIG. 1.

Frame anchor 26 is configured to be operated manually by a caregiver as suggested in FIG. 2 to free movable backrest frame 22 so that it can be moved relative to foldable backrest 18 to disengage frame receiver 28 provided in seat base 12. Once freed, foldable backrest 18 can be pivoted by a caregiver about pivot axis 16 in, for example, a direction toward seat bottom 30 to assume a compact folded storage position.

As suggested diagrammatically in FIG. 1, frame anchor 26 is coupled to backrest frame 22 to move therewith relative to foldable backrest 18 and is also coupled to foldable backrest 18. Frame anchor 26 is configured to provide lock means (represented diagrammatically by phantom boxes 261 and 262 in FIGS. 1 and 2) for anchoring movable backrest frame 22 in a fixed position relative to foldable backrest 18 when foldable backrest 18 lies in an upright use position relative to seat base 12 and when backrest frame 22 mates with frame receiver 28 included in seat base 12. Frame anchor 26 is also configured to provide actuator means (represented by phantom lines 263, 264 in FIGS. 1 and 2) for disabling lock means 261, 262 at the option of a caregiver to allow the caregiver to unmate backrest frame 22 from frame receiver 28 to free foldable backrest 18 for movement relative to seat base 12 to assume a compact folded storage position. In an illustrative embodiment, lock means 261, 262 is coupled to foldable backrest 18 to move therewith and the actuator means 263, 264 is coupled to movable backrest frame 22 to move therewith and also to lock means 261, 262.

Figure 4:
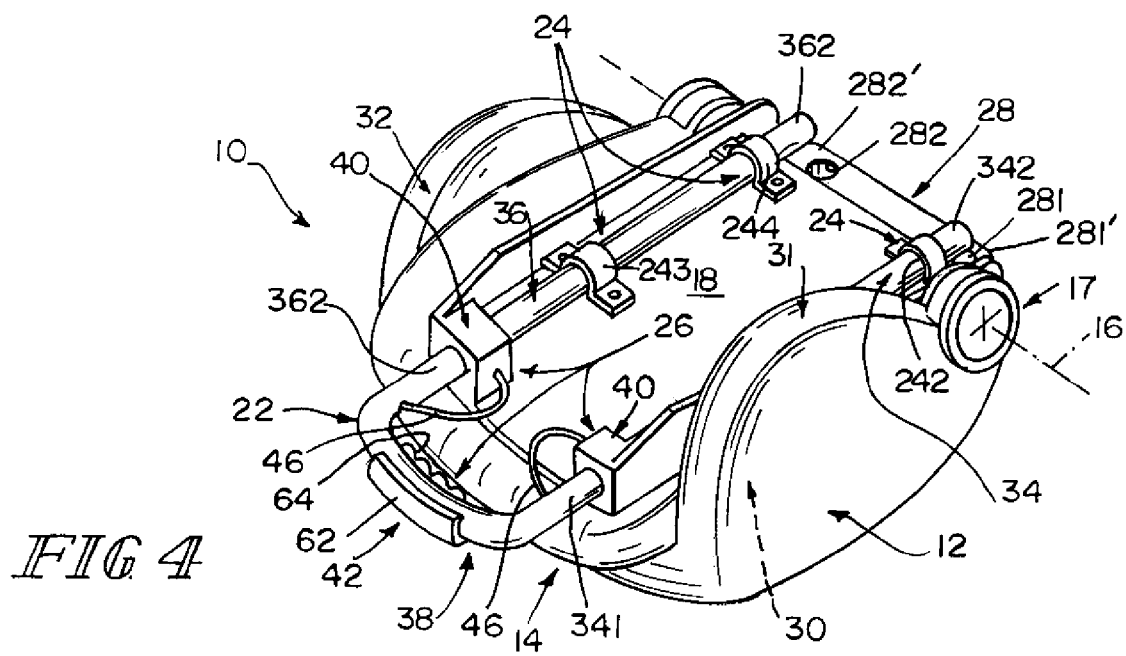
FIG. 4 is a perspective view similar to FIG. 3 after manual release of the frame anchor by a caregiver in a manner suggested in FIGS. 5 and 6 and forward pivoting movement of the foldable backrest relative to the seat base about a pivot axis to assume a folded storage position in a manner suggested, for example, in FIGS. 7 and 8 and showing removal of lower ends of each of the first and second backrest-lock legs from leg-receiving sockets formed in the frame receiver coupled to a rear portion of a seat bottom included in the seat base.

An illustrative example of juvenile vehicle seat 10 is shown in FIGS. 3-10. Seat base 12 includes first and second armrests 31, 32 and seat bottom 30 is arranged to lie between and below first and second armrests 31, 32, as suggested in FIG. 3. As shown in FIG. 4, frame receiver 28 has a first end 281' located behind first armrest 31 and an opposite second end 282' located behind second armrest 32. Foldable backrest 18 is arranged to lie above seat bottom 30 and in a space provided between first and second armrests 31, 32 when foldable backrest 18 is moved in counterclockwise direction 19 as suggested in FIG. 3 to assume the compact folded storage position as suggested in FIG. 4. Seat base 12 also includes a pivotable kickstand 33 arranged as shown to support seat bottom 30 on an underlying surface 35 provided by, for example, a vehicle seat or a storage shelf or suggested in FIGS. 5 and 8.

Backrest frame 22 is a U-shaped tubular member in the illustrative embodiment shown in FIGS. 3-10. Backrest frame 22 includes first and second backrest-lock legs 34, 36 arranged to lie in spaced-apart parallel relation to one another. In an illustrative embodiment, backrest frame 22 also includes a style bar 38 arranged to interconnect upper end 341 of first backrest-lock leg 34 and upper end 361 of second backrest-lock leg 36 as suggested in FIGS. 3 and 4. First backrest-lock leg 34 also includes an opposite, distal, lower end 342 arranged to mate with frame receiver 28 as suggested in FIGS. 4, 5, and 9. Second backrest-lock leg 36 also includes an opposite, distal, lower end 362 arranged to mate with frame receiver 28 as suggested in FIG. 4.

Frame guide 24 includes separate upper and lower first leg guides 241, 242 for first backrest-lock leg 34 of movable backrest frame 22 and separate upper and lower second leg guides 243, 244 for second backrest-lock leg 36 of movable backrest frame 22 as suggested, for example in FIGS. 4, 5, and 9. Each of leg guides 241-244 includes first and second flanges 245, 246 coupled to a rear surface of foldable backrest 18 and a curved link 247 arranged to interconnect companion first and second flanges 245, 246 (as suggested in FIG. 9) and cooperate with foldable backrest 18 to form a leg-receiving space located therebetween and sized to receive one of backrest-lock legs 34, 36 therein (as suggested in FIG. 4) and allow sliding movement of such backrest-lock leg back and forth therein during movement of backrest frame 22 relative to foldable backrest 18 (as suggested in FIGS. 9 and 10).

Frame receiver 28 is formed to include a first leg receiver defined by a first leg-receiving socket 281 sized to receive lower end 342 of first backrest-lock leg 34 therein as suggested in FIGS. 5-10 when backrest frame 22 is mated to frame receiver 28 to establish the backrest-locking position. Frame receiver 28 is also formed to include a second leg receiver defined by a second leg-receiving socket 282 sized to receive lower end 362 of second backrest-lock leg 36 therein as suggested in FIG. 4 when backrest frame 22 is mated to frame receiver 28 to establish the backrest-locking position.

As suggested in FIGS. 9 and 10, an illustrative frame anchor 26 comprises a lock unit 40 coupled to foldable backrest 18 to move therewith and an actuator unit 42. Actuator unit 42 comprises a trigger unit 44 mounted on style bar 38 of backrest frame 22 and a cable 46 coupled to trigger unit 44 and lock unit 40 and configured to communicate a mechanical or electrical lock-release signal 48 from trigger unit 44 to lock unit 40 as suggested in FIG. 10 that is effective to change lock unit 40 from a locked state shown, for example, in FIG. 9 to an unlocked state shown, for example, in FIG. 10.

An illustrative lock unit 40 comprises a housing 50 mounted on foldable backrest 18 and formed to include a leg-receiving passage 52 and a pin-receiving chamber 54, a lock pin 56 mounted for movement in pin-receiving chamber 54 between a projected leg-engaging position shown in FIG. 9 and a withdrawn leg-disengaging position shown in FIG. 10, and a spring 58 located in pin-receiving chamber 54 and arranged normally and yieldably to urge lock pin 56 to the projected leg-engaging position shown in FIG. 9. In such a position, a distal tip of lock pin 56 is arranged to extend into a pin receiver 60 formed in a companion leg 34 as shown in FIG. 9 to anchor backrest frame 22 in a fixed position relative to foldable backrest 18 when foldable backrest 18 lies in an upright use position relative to seat base 12 and when lower end 342 of leg 34 extends into first leg-receiving socket 281 formed in frame receiver 28 of seat base 12.

An illustrative trigger unit 44 includes a trigger mount 62 coupled to style bar 38 of backrest frame 22, a trigger 64 associated with trigger mount 62, and a spring 66. Trigger 64 is mounted for movement relative to trigger mount 62 between a rest position shown in FIG. 9 and an actuated position shown in FIG. 10. Spring 66 is arranged normally and yieldably to urge trigger 64 to the rest position. A caregiver 70 can squeeze trigger unit 44 to move trigger 64 in direction 72 toward trigger mount 62 to compress spring 66 and pull a wire 74 provided in cable 46 to cause lock pin 56 in lock unit 40 to move from the projected leg-engaging position shown in FIG. 9 to the withdrawn leg-disengaging position shown in FIG. 10.

A juvenile vehicle seat 210 in accordance with another embodiment of the disclosure includes a seat base 212 and a seat back 214 including a foldable backrest 218 coupled to seat base 212 at a pivot axis 216 using any suitable axle 217 as suggested in FIGS. 11-13. Seat back 214 also includes a backrest lock 220 configured normally to retain foldable backrest 218 in an upright use position shown, for example, in FIGS. 11 and 12 in a manner suggested herein in reference to the embodiments disclosed in FIGS. 1 and 2 and FIGS. 3-10.

Seat base 212 includes a seat bottom 230, a frame receiver 228 coupled to a rear portion of seat bottom 230 and configured to mate with a movable backrest frame 222 included in backrest lock 220, and first and second armrests 231, 232. Each armrest 231, 232 is mounted for pivotable movement about an armrest pivot axis 201 or 202 relative to seat bottom 230. In an illustrative embodiment, first armrest 231 is pivotable about pivot axis 201 between a raised use position shown in FIG. 11 and a lowered storage position shown in FIG. 13. First armrest 231 has a somewhat vertical orientation in the raised use position as suggested in FIG. 11 and a somewhat horizontal orientation in the lowered storage position as suggested in FIG. 3. Second armrest 232 is similar to first armrest 231 in structure and function and is arranged to pivot about pivot axis 202.

Each armrest 231, 232 has a proximal lower end 203 formed to include a sleeve 204 mounted to rotate about an axle 205 defining a companion armrest pivot axis 201 or 202. Each armrest 231, 232 also includes a distal upper end 206 arranged to mate with a side rim 207 of foldable backrest 218 in the raised use position as shown in FIG. 11 and separate from foldable backrest 218 in the lowered storage position as suggested in FIG. 13. Upper ends 206 of first and second armrests 231, 232 are arranged to lie in spread-apart relation to one another and extend in opposite directions when move to the lowered storage positions to facilitate folding of backrest 218 and access of a juvenile to assume a seated position on seat bottom 230 of seat base 212.

Armrests 231, 232 can be folded downwardly about pivot axes 201, 202 to assume their lowered storage positions to allow foldable backrest 218 to be folded in a forward direction 19 toward seat bottom 230 to assume a compact folded storage position in a space provided between armrests 231, 232. When armrests 231, 232 are folded upwardly about pivot axes 201, 202, they mate with side rims 207 as suggested in FIG. 11 and are locked in a stationary position relative to seat bottom 230 to provide an auxiliary backrest lock in addition to a primary backrest lock 220.

Top surface 206 of armrests 231, 232 become narrower in front to fit backrest 218 when folded and are made, for example, of a soft foam material. A front portion 231 of seat bottom 230 is convex and round to allow large bolsters 291, 292 in headrest 290 of foldable backrest 218 to nest further back yet juvenile vehicle seat 210 still has a full depth in the center.

The invention claimed is:

1. A compatible juvenile vehicle seat comprising:
    a seat base adapted to set on a vehicle seat and formed to include a seat bottom adapted to support a juvenile in a seated position and an axle associated with the seat bottom,
    a foldable backrest mounted on the axle for folding movement between an upright use position arranged to extend upwardly away from the seat bottom and adapted to support a juvenile in the seated position on the seat bottom and a compact folded storage position arranged to extend long the seat bottom and lie in confronting relation to the seat bottom, a backrest lock, configured to provide means for retaining the foldable backrest in the upright use position, and for releasing the foldable backrest to free the foldable backrest so that, once freed, the foldable backrest can be pivoted about a pivot axis established by the axle to assume the compact folded storage position, wherein the backrest lock includes a backrest frame mounted for movement on the foldable backrest between a backrest-locking position engaging a frame receiver included in the seat base to block pivotable movement of the foldable backrest about the pivot axis and a backrest-releasing position disengaging the frame receiver to free the foldable backrest to pivot on the axle about the pivot axis between the upright use position and the compact folded storage position, wherein the foldable backrest includes a front surface adapted to contact a juvenile resting in the seated position on the seat bottom and an oppositely facing rear surface, the front surface is arranged to lie in confronting relation to the seat bottom upon movement of the foldable backrest to the compact folded storage position, and the backrest frame is mounted for movement on the rear surface of the foldable backrest, and wherein the seat base further includes spaced-apart first and second armrests, the seat bottom is arranged to lie between and below the first and second armrests, and a portion of the backrest frame is arranged to lie between the first and second armrests upon movement of the foldable backrest to the compact folded storage position.

2. The compactible juvenile seat of claim 1 wherein the backrest frame includes a first backrest-lock leg and the frame receiver is formed to include a first leg-receiving socket sized to receive a lower end of the first backrest-lock leg of the backrest frame when the backrest frame is mated to the frame receiver to establish the backrest-locking position.

3. The compactible juvenile seat of claim 2, wherein the frame receiver is formed to include a second leg-receiving socket, the backrest frame further includes a second backrest-lock leg, and a lower end of the second backrest-lock leg is arranged to extend into the second leg-receiving socket when the backrest frame is mated to the frame receiver to establish the backrest-locking position.

4. The compactible juvenile vehicle seat of claim 1, wherein the frame receiver is located behind the first and second armrests and, upon movement of the foldable backrest to the upright use position, under the foldable backrest.

5. A compactible juvenile vehicle seat comprising a seat base adapted to set on a vehicle seat and formed to include a seat bottom adapted to support a juvenile in a seated position and an axle associated with the seat bottom, a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom, a backrest lock configured to provide means for retaining the foldable backrest in the upright use position and for releasing the foldable backrest to free the foldable backrest so that, once freed, the foldable backrest can be pivoted about a pivot axis established by the axle to assume the compact folded storage position, wherein the backrest lock includes a backrest frame mounted for movement on the foldable backrest between a backrest-locking position engaging a frame receiver included in the seat base to block pivotable movement of the foldable backrest about the pivot axis and a backrest-releasing position disengaging the frame receiver to free the foldable backrest to pivot on the axle about the pivot axis between the upright use position and the compact folded storage position, wherein the foldable backrest includes a front surface adapted to contact a juvenile resting in the seated position on the seat bottom and an oppositely facing rear surface, the front surface is arranged to lie in confronting relation to the seat bottom upon movement of the foldable backrest to the compact folded storage position, and the backrest frame is mounted for movement on the rear surface of the foldable backrest, and wherein the backrest lock further includes a frame guide coupled to the rear surface of the foldable backrest and configured to form a first leg-receiving space and the backrest frame includes a first backrest-lock leg arranged to extend into and move in the first leg-receiving space during movement of the backrest frame between the backrest-locking position and the backrest-releasing position.

6. The compactible juvenile seat of claim 5, wherein the backrest lock further includes a frame anchor including a lock unit and an actuator unit, the lock unit is coupled to the foldable backrest to move therewith and configured to provide means for establishing a locked state to retain the first backrest-lock leg in the backrest-locking position and an unlocked state to free the first backrest-lock leg for movement relative to the foldable backrest and the seat base from the backrest-locking position to the backrest-releasing position, the actuator unit includes a trigger unit and a cable, the trigger unit is coupled to the backrest frame to move therewith and configured to generate a lock-release signal in response to an instruction provided by a caregiver, and the cable is coupled to the trigger unit and to the lock unit and configured to provide means for communicating the lock-release signal generated by the trigger unit to the lock unit to change the lock unit from the locked state to the unlocked state so that the caregiver can move the backrest frame from the backrest-locking position to the backrest-releasing position.

7. The compactible juvenile seat of claim 5, wherein the frame receiver is formed to include an upwardly opening first leg-receiving socket sized to receive a lower end of the first backrest-lock leg of the backrest frame when the backrest frame is mated to the frame receiver to establish the backrest-locking position.

8. The compactible juvenile seat of claim 5, wherein the backrest frame further includes a second backrest-lock leg arranged to extend into and move in a second leg-receiving space formed in the frame guide to lie in spaced-apart relation to the first leg-receiving space and a cross bar coupled to each of the first and second backrest-lock legs to link the first and second backrest-lock legs together for movement in unison relative to the foldable backrest.

9. A compactible juvenile vehicle seat comprising a seat base adapted to set on a vehicle seat and formed to include a seat bottom adapted to support a juvenile in a seated position and an axle associated with the seat bottom, a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom, and a backrest lock configured to provide means for retaining the foldable backrest in the upright use position and for releasing the foldable backrest to free the foldable backrest so that, once freed, the foldable backrest can be pivoted about a pivot axis established by the axle to assume the compact folded storage position, wherein the backrest lock includes a backrest frame mounted on a rear surface of the foldable backrest for vertical movement on the foldable backrest between a backrest-locking position engaging a frame receiver included in the seat base to block pivotable movement of the foldable backrest about the pivot axis and a backrest-releasing position disengaging the frame receiver to free the foldable backrest to pivot on the axle about the pivot axis between the upright use position and the compact folded storage position.

10. A compactible juvenile vehicle seat comprising a seat base including a seat bottom and a frame receiver coupled to a rear portion of the seat bottom, and a seat back including a foldable backrest coupled to the seat base for movement relative to the seat base about a pivot axis between an upright use position and a compact folded storage position and a backrest lock configured normally to retain the foldable backrest in the upright use position, wherein the backrest lock includes a movable backrest frame mounted on a rear surface of the foldable backrest, a frame guide coupled to the foldable backrest and to the movable backrest frame and configured to guide vertical movement of the movable backrest frame relative to the foldable backrest between a backrest-locking position engaging the frame receiver upon movement of the foldable backrest to the upright use position to block movement of the foldable backrest about the pivot axis and a backrest-releasing position disengaging the frame receiver to allow movement of the foldable backrest about the pivot axis toward the compact folded storage position, and a frame anchor configured normally to retain the movable backrest frame in the backrest-locking position upon movement of the foldable backrest to the upright use position.

11. A compactible juvenile vehicle seat comprising a seat base adapted to set on a vehicle seat and formed to include a seat bottom adapted to support a juvenile iii a seated position and an axle associated with the seat bottom, a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom, a backrest lock configured to provide means for retaining the foldable backrest in the upright use position and for releasing the foldable backrest to free the foldable backrest so that, once freed, the foldable backrest can be pivoted about a pivot axis established by the axle to assume the compact folded storage position, wherein the backrest lock includes a backrest frame mounted for movement on the foldable backrest between a backrest-locking position engaging a frame receiver included in the seat base to block pivotable movement of the foldable backrest about the pivot axis and a backrest-releasing position disengaging the frame receiver to free the foldable backrest to pivot on the axle about the pivot axis between the upright use position and the compact folded storage position, and wherein the backrest lock further includes lock means for anchoring the backrest frame in a fixed position relative to the foldable backrest when the foldable backrest lies in the upright use position relative to the seat base and when the backrest frame mates with the frame receiver included in the seat base.

12. The compactible juvenile seat of claim 11, wherein the backrest frame includes a first backrest-lock leg, the lock means includes a housing mounted on the foldable backrest to move therewith and formed to include a leg-receiving passage and a pin-receiving chamber, the lock means further includes a lock pin mounted for movement in the pin-receiving chamber between a projected leg-engaging position engaging the first leg and a withdrawn leg-disengaging position disengaging the first backrest-lock leg and a spring located in the pin-receiving chamber and arranged normally and yieldably to urge the lock pin to the projected leg-engaging position to cause a distal tip of the lock pin to extend into a pin receiver formed in the first backrest-lock leg to anchor the backrest frame in a fixed position relative to the foldable backrest when the foldable backrest lies in the upright use position and the backrest frame is moved to assume the backrest-locking position engaging the frame receiver included in the seat base.

13. The compactible juvenile seat of claim 12, wherein the backrest lock further includes actuator means for disabling the lock means by withdrawing the distal tip of the lock pin from the pin receiver formed in the first backrest-lock leg at the option of a caregiver to allow the caregiver to move the backrest frame to the backrest-releasing position to free the foldable backrest for movement relative to the seat base to assume the compact folded storage position and the actuator means includes a trigger unit coupled to the backrest frame to move therewith and a pull wire coupled to the lock pin and to a movable trigger included in the trigger unit and configured to cause the lock pin to move from the projected leg-engaging position to the withdrawn leg-disengaging position in response to movement of the movable trigger relative to the backrest frame.

14. The compactible juvenile seat of claim 11, wherein the backrest lock further includes actuator means for disabling the lock means to free the backrest frame for movement from the fixed position at the option of a caregiver to allow the caregiver to move the backrest frame to the backrest-releasing position to free the foldable backrest for movement relative to the seat base to assume the compact folded storage position.

15. A compactible juvenile vehicle seat comprising a seat base including a seat bottom and a frame receiver coupled to a rear portion of the seat bottom, a seat back including a foldable backrest coupled to the seat base for movement relative to the seat base about a pivot axis between an upright use position and a compact folded storage position and a backrest lock configured normally to retain the foldable backrest in the upright use position, wherein the backrest lock includes a movable backrest frame, a frame guide coupled to the foldable backrest and to the movable backrest frame and configured to guide movement of the movable backrest frame relative to the foldable backrest between a backrest-locking position engaging the frame receiver upon movement of the foldable backrest to the upright use position to block movement of the foldable backrest about the pivot axis and a backrest-releasing position disengaging the frame receiver to allow movement of the foldable backrest about the pivot axis toward the compact folded storage position, and a frame anchor configured normally to retain the movable backrest frame in the backrest-locking position upon movement of the foldable backrest to the upright use position, and wherein the backrest frame is a U-shaped tubular member and includes first and second backrest-lock legs arranged to lie in spaced-apart parallel relation to one another and a style bar arranged to interconnect an upper end of the first backrest-lock leg and an upper end of the second backrest-lock leg, a lower end of the first backrest-lock leg is arranged to extend into a first leg-receiving socket formed in the frame receiver upon movement of the movable backrest frame to the backrest-locking position, and a lower end of the second backrest-lock leg is arranged to extend into a second leg-receiving socket formed in the frame receiver and located in spaced-apart relation to the first leg-receiving socket upon movement of the movable backrest frame to the backrest-locking position.

16. The compactible juvenile vehicle seat of claim 15, wherein the frame guide includes first and second leg guides coupled to the foldable backrest to move therewith, the first leg guide forms a first leg-receiving space receiving the first backrest-lock leg therein to allow sliding movement of the first backrest-lock leg therein during movement of the backrest frame relative to the foldable backrest, and the second leg guide forms a second leg-receiving space receiving the second backrest-lock leg therein to allow sliding movement of the second backrest-lock leg therein during movement of the backrest frame relative to the foldable backrest.

17. The compactible juvenile vehicle seat of claim 15, wherein the frame anchor includes a lock unit coupled to the foldable backrest to move therewith and an actuator unit and the actuator unit includes a trigger unit mounted on the style bar of the backrest frame and a cable coupled to the trigger unit and to the lock unit and configured to provide means for communicating a lock-release signal from the trigger unit to the lock unit that is effective to change the lock unit from a locked state retaining the backrest frame in the backrest-locking position and an unlocked state releasing the backrest frame for movement relative to the foldable backrest.

18. The compactible juvenile vehicle seat of claim 17, wherein the lock unit includes a housing mounted on the foldable backrest to move therewith and formed to include a leg-receiving passage and a pin-receiving chamber, the lock means further includes a lock pin mounted for movement in the pin-receiving chamber between a projected leg-engaging position engaging the first backrest-lock leg and a withdrawn leg-disengaging position disengaging the first backrest-lock leg and a spring located in the pin-receiving chamber and arranged normally and yieldably to urge the lock pin to the projected leg-engaging position to cause a distal tip of the lock pin to extend into a pin receiver formed in the first backrest-lock leg to anchor the backrest frame in a fixed position relative to the foldable backrest when the foldable backrest lies in the upright use position and the backrest frame is moved to assume the backrest-locking position engaging the frame receiver included in the seat base.

19. The compactible juvenile vehicle seat of claim 17, wherein the trigger unit includes a trigger mount coupled to the style bar, a trigger associated with the trigger mount, and a spring, the trigger is mounted for movement relative to the trigger mount between a rest position and an actuated position, the spring is arranged normally and yieldably to urge the trigger to the rest position, the trigger is arranged to be moved by an operator in a direction toward the trigger mount to compress the spring and pull a wire provided in the cable to cause a lock pin included in the lock unit to move from a projected leg-engaging position in a pin receiver formed in the first backrest-lock leg to a withdrawn leg-engaging position away from the pin receiver formed in the first backrest-lock leg.

* * * * *